United States Patent [19]

Tas

[11] Patent Number: 5,157,899
[45] Date of Patent: Oct. 27, 1992

[54] METHOD OF AND APPARATUS FOR SORTING AND BUNDLING FLOWERS

[76] Inventor: Adrianus W. Tas, Burg. Winkellaan 3, 2631 HG Nootdorp, Netherlands

[21] Appl. No.: 675,597

[22] Filed: Mar. 28, 1991

[30] Foreign Application Priority Data

Mar. 28, 1990 [NL] Netherlands .................. 9000731

[51] Int. Cl.$^5$ ........................................ B65B 13/02
[52] U.S. Cl. ........................................ 53/399; 53/435; 53/513; 53/588; 198/365; 198/431; 198/803.8; 209/551; 209/912
[58] Field of Search ............ 209/503, 551, 552, 559, 209/563, 564, 586, 606, 706, 707, 903, 912, 925, 933; 198/365, 431, 470.1, 477.1, 803.8; 53/399, 148, 500, 504, 513, 522, 588, 435

[56] References Cited

U.S. PATENT DOCUMENTS

| | | | |
|---|---|---|---|
| 3,220,154 | 11/1965 | Van Der Schoot | 53/55 X |
| 3,401,796 | 9/1968 | Hagiz | 209/586 X |
| 3,659,709 | 5/1972 | Bartlett, Jr. et al. | 209/551 |
| 4,601,156 | 7/1986 | Parry et al. | 53/399 |
| 4,610,361 | 9/1986 | Elliot | 209/912 X |

FOREIGN PATENT DOCUMENTS 2713224 10/1978 Fed. Rep. of Germany ...... 209/903
7310250 1/1975 Netherlands .................. 209/552

*Primary Examiner*—Robert P. Olszewski
*Assistant Examiner*—Edward M. Wacyra
*Attorney, Agent, or Firm*—Griffin, Branigan & Butler

[57] ABSTRACT

The invention relates to a method of sorting and bundling flowers, comprising hanging the flowers separately in individual flower supporting members circulating in a first closed path; as they are traversing the path, designating the flowers as to at least one characteristic, such as stem length; depending on the designated characteristic, transferring the flowers to second flower supporting members circulating in a second path; grouping the flowers into groups of a limited number of flowers; and collecting and bundling a series of groups into a bunch. The individual flower supporting members are moved adjacent a transfer point from a transport position into a transfer position in a tract substantially perpendicular to the first path, while during transfer the second flower supporting members are held stationary and oriented in the direction of movement of the individual flower supporting members. The invention further relates to apparatus for applying this method.

14 Claims, 3 Drawing Sheets

METHOD OF AND APPARATUS FOR SORTING AND BUNDLING FLOWERS

BACKGROUND OF THE INVENTION

This invention relates to a method of, and apparatus for, sorting and bundling flowers. In the prior art, the method has the following steps:

- hanging the flowers separately in individual flower supporting members moving in a first closed path;
- as they are traversing said path, the flowers are selected as to at least one characteristic, such as stem length;
- depending on the characteristic, transferring the selected flowers to receiving flower supporting members moving in a second path;
- grouping the flowers into groups of a limited number of flowers; and
- collecting and bundling a series of groups into a bunch.

Sorting flowers as to a given characteristic, for example, stem length, and subsequently bundling flowers having the same characteristic is difficult to mechanize, especially as flowers are tender products which are apt to become damaged. One especially critical operation is the transfer of the flowers from a flower carrying support member moving in a first closed path to a flower receiving support member moving in a second path. The number of transfers per flower should be minimized and during each transfer the movements of a flower carrying member and a flower receiving member must be well attuned to each other as regards both velocity and direction. A further important point is that during grouping the flower heads must not bear upon each other, as this may easily cause them to break off.

The problems outlined above are aggravated even further with increasing handling speeds.

Netherlands patent application 7310250 discloses a flower sorting apparatus in which flowers of a given stem length are transferred from a first conveyor to an intermediate conveyor associated with a particular stem length, and subsequently to a flower group supporting member which occupies an inclined position relative to the horizontal plane. In the first conveyor, the flowers are supported by horizontal, L-shaped flower supporting members which in the transfer position make a pivoting movement whereby the flower traverses a circular path terminating in an individual flower receiving member of the intermediate conveyor, which during transfer is driven by the L-shaped flower supporting member. Slotted openings in flower supporting member and flower receiving member are in alignment with each other. It is difficult for these slotted openings to be well aligned, which is a condition for flower transfer free from damage. The L-shaped flower supporting members occupy a lot of space in the first conveyor, so that the number of flower supporting members per unit length is very limited. To achieve a reasonable operating speed at all, the first conveyor would have to be driven at a high velocity. This, however, makes it considerably more difficult to place flowers in the flower supporting members of the conveyor.

From the intermediate conveyor, the flowers slide into an inclined flower group supporting member, whereby the flower heads are pushed against each other.

SUMMARY OF THE INVENTION

It is an object of the present invention to provide a method and an apparatus in which the number of operations during sorting is reduced, and each operation is better adapted to the tender product, while yet a high speed of operation is achieved. For this purpose, the method according to this invention is characterized in that first individual flower supporting members are moved in a first path from positions where the members are in a transport condition to a transfer position adjacent a transfer point in a second path which is substantially perpendicular to the direction of movement of said first path. During transfer of flowers, second flower supporting members are held stationary in the second path, as opposed to the prior art, and are oriented in the direction of movement of the first flower supporting members.

By virtue of the second flower supporting members being moved perpendicularly to the direction of movement of the first path to the transfer point, more first flower supporting members can be provided in the first conveyor per unit length, as a result of which the capacity can be considerably increased. Also, the first flower supporting members need not be moved to its transfer position exactly at the moment when they are opposite to the second flower supporting members, since this movement may already be performed and, hence, a more gradual movement is achieved. The orientation of the second flower supporting member makes it possible for the second flower supporting member to be formed as a group of supporting members adapted to receive, successively, a predetermined number of flowers. As a consequence, the prior art intermediate conveyor can be eliminated, the routing of the flowers is simplified, and the number of transfers is reduced to one.

The apparatus disclosed in Netherlands patent application 7310250 has the following elements:

- a first conveyor including an array of first individual flower supporting members arranged to be brought from a transport position into a transfer position;
- a designation station for designating flowers carried by said first conveyor as to at least one characteristic, such as stem length;
- a series of second conveyors disposed next to the path of movement of said first conveyor, and having an array of second flower supporting members to which at least one flower can be transferred from a first flower supporting member placed in the transfer position;
- means for grouping a limited number of equally designated flowers in a slotted bifurcated flower supporting member.

According to the present invention, this apparatus is adapted for application of the method described above by virtue of the fact that the individual flower first supporting members of the first conveyor are arranged to be shifted from a transport position to a transfer position in a straight line substantially perpendicular to the direction of movement of the first conveyor, while during transfer the second flower supporting members are in a stationary position with a flower receiving slot oriented according to the direction of movement of the first flower supporting members.

In this apparatus, each flower supporting member of the first conveyor is preferably mounted for axial sliding movement in a carrier including a spring-loaded catch mechanism for holding the flower supporting member in an extended transfer position, with the catch mechanism being arranged to be unlocked by means of a cam arranged in its path of movement.

In this way, a flower can be positioned in a second flower supporting member at an exactly determined place. This is of particular importance if the second flower supporting member are arranged to receive more than one flower. By virtue of that arrangement, the flower heads are not pushed against each other.

It is noted that U.S. Pat. No. 3,659,709 discloses a flower sorting apparatus comprising a first conveyor including flower carrying members and associated stem length detectors, a series of intermediate conveyors arranged perpendicularly to the direction of movement of the first conveyor for receiving flowers of a given stem length, a transfer conveyor for transferring flowers from the intermediate conveyors to a terminal conveyor, which is equipped with flower supporting members for receiving a group of flowers. The flower receiving members of both the intermediate conveyors and the terminal conveyor are provided with slots oriented in the direction of movement of the first conveyor and the transfer conveyor, respectively. The flower carrying members of the first conveyor are provided with pivoting camming discs which in the transfer position describe a circular path under the direction of a controllable cam follower. The flower carrying members proper are mounted on the camming discs by means of a parallel guide. The number of camming discs per unit length of the conveyors is small. The transfer conveyor is equipped with similar camming discs, which during the transfer operation have to follow a complicated track. The number of operations to which the flowers are subjected in that apparatus is considerably larger than in the apparatus according to the present invention, while the apparatus itself is highly complicated.

BRIEF DESCRIPTION OF THE DRAWINGS

The method according to the present invention and an embodiment of the apparatus for the application thereof will now be described, by way of example, with reference to the accompanying drawings. In said drawings.

DESCRIPTION OF A PREFERRED EMBODIMENT

Figure 1:
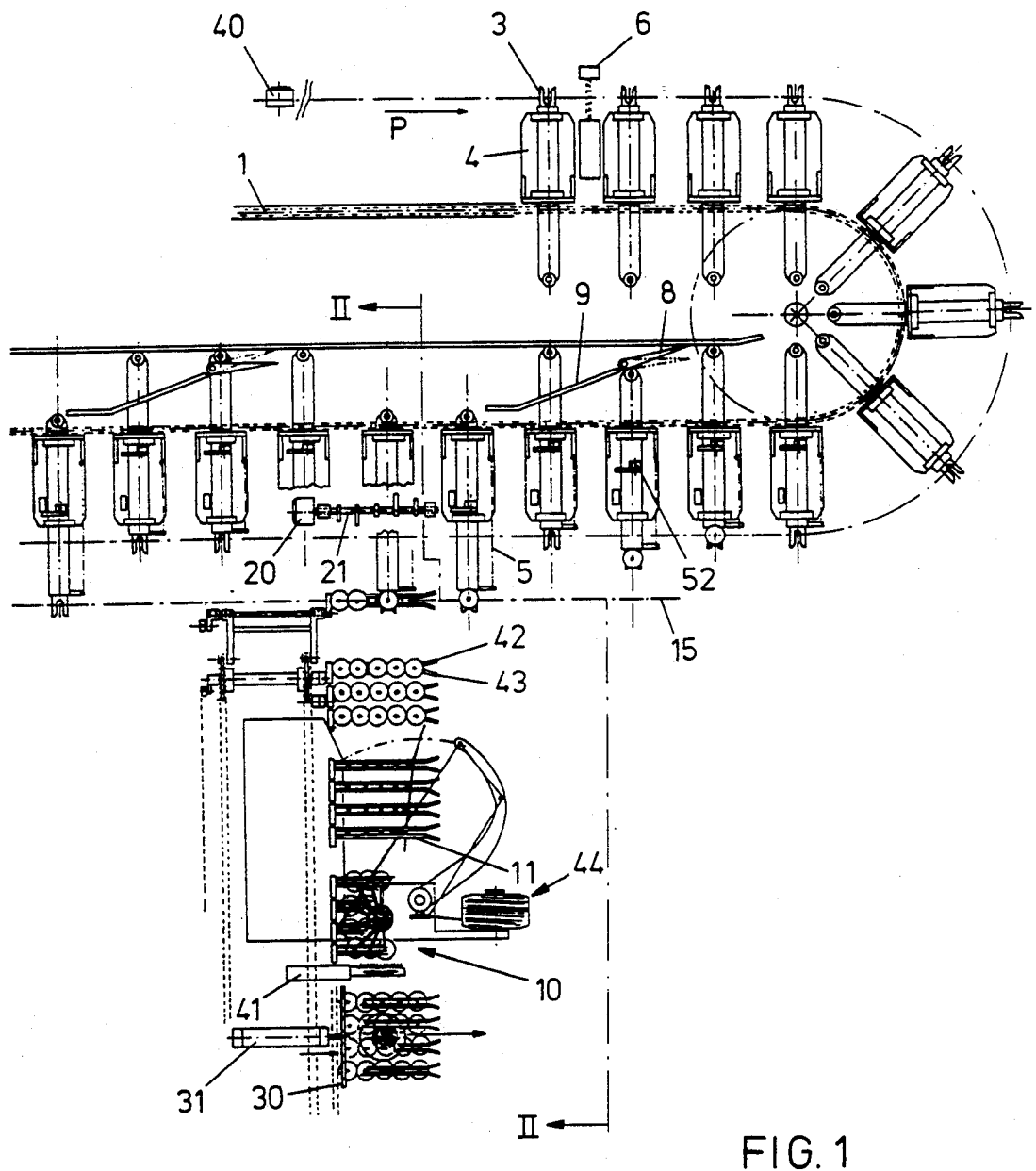
FIG. 1 illustrates a schematic top plan view of the apparatus according to the present invention.

The apparatus for sorting and bundling flowers comprises a first conveyor 1, into which flowers 2 are hung by hand. For this purpose, conveyor 1 includes fork-shaped or bifurcated individual flower first supporting members 3 mounted for axial sliding movement in carriers 4, which carriers are fixedly connected to conveyor 1. The first flower supporting members 3 are maintained in a transport position in carriers 4 by means of a tension spring 5. The direction of movement of conveyor 1 is indicated by an arrow P in FIG. 1.

Arranged alongside the path traversed by the first flower supporting members 3 is a wetting member 40 in the form of a sprayer, sponge or the like, to wet the members and thereby prevent damage to the flowers 2 during their handling.

During their passage of the closed path through conveyor 1 in the direction indicated by arrow P, the flowers 2 (see FIG. 2) pass a measuring station 6 (see FIGS. 1 and 3) which includes a series of photocells 7 arranged at different levels with light sources 7' placed in opposition thereto. Photocells 7 are connected to a computer (not shown) with a memory in which the measured stem length of a flower 2 is stored, coupled with the serial number (not shown in the drawings) of carrier 4. As further shown by FIG. 1, the apparatus includes a series of second conveyors 10, each provided with a plurality of groupwise arranged bifurcated second flower supporting members 11 capable of supporting a limited number of grouped flowers 2. Conveyors 10, only one of which is shown, are arranged in closely-spaced interrelationship alongside the path traversed by conveyor 1.

Figure 4:
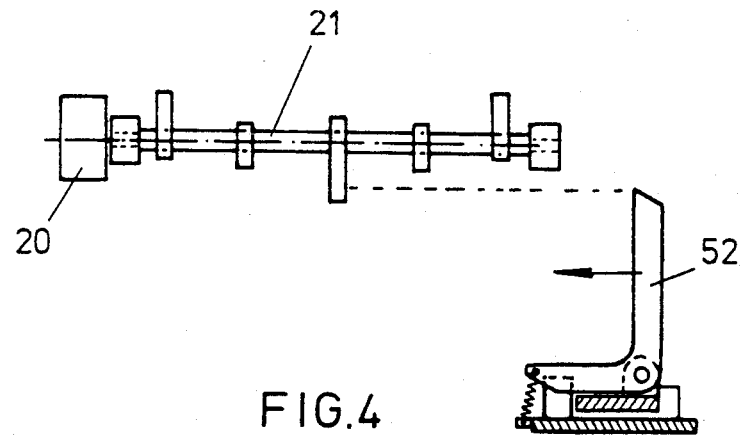
FIG. 4 is a diagrammatic elevational view, showing the means for delivering flowers in fixed, adjustable positions.

The individual first flower supporting members 3 can be moved outwards, relative to carrier 4, into the transfer position by means of a switch 8 and a guide 9. Switch 8 is operated by the above-noted computer to deliver a flower 2 to a predetermined one of conveyors 10, e.g. based on stem length. When the switch 8 is placed in the position shown in solid lines in FIG. 1, the fork of the first supporting member 3 with the flower 2 therein will be moved outwards of carrier 4 until the flower 2 is in the plane of the dotted line 15 in FIG. 1. The first flower supporting member 3 is held in that extended transfer position of plane 15 by a catch mechanism 52 provided in carrier 4, which prevents spring 5 from retracting the first flower supporting member 3 back into carrier 4 to the transport position. As can be seen from FIG. 1, line 15 coincides with the axis of the fork-shaped slot of the second flower supporting member 11, so that with continued movement of conveyor 1 and, hence, carrier 4 and supporting member 3, flower 2 will automatically move into a corresponding slot of one of the forks of second support member 11, i.e. the fork positioned at line 15. Flower 2 can be delivered to the slot of the fork of member 11 at different places by means of a mechanism which comprises a camshaft 21 (also see FIG. 4) controlled by a rotary magnet (rotary stepping motor or solenoid,) 20. Camshaft 21 (see FIG. 4) is provided with a camset having as many cams as there are flower receiving positions in the slot of a fork of member 11. Carrier 4 with the flower supporting member 3 in the extended transfer position will continue to move along line 15 until the catch mechanism 52 (also see FIG. 4) provided on carrier 4 strikes a cam of camshaft 21. The catch mechanism 52 will then be lifted out of its locked position, i.e. positioned against the retraction action of tension spring 5, and subsequently the flower supporting member 3 is rapidly withdrawn back into carrier 4 and away from line 15. When the slot fork of member 11 is empty, the rearmost cam of camshaft 21 will be placed in the path of the catch mechanism 52, and the flower 2 will be delivered in the rearmost position of the fork of member 11. Subsequently, the adjacent cam will be moved into the path of a catch mechanism 52, so that the next flower 2 will be placed next to the earlier transferred flower in the slot fork of member 11. This system is known from U.S.

Pat. No. 3,220,154. As soon as the slot fork of member 11 is fully filled with flowers—five in the present illustration—the chain of the second conveyor 10 from which member is suspended is moved by a small increment to move a next member 11 in the path of line 15. When four members 11 of a group are filled with flowers, as shown by FIG. 1, conveyor 10 can be moved a greater distance to create a space between successive groups of members 11, which are needed to bundle the flowers present in a group of members 11. The bundling device, generally, 44 is shown schematically in FIG. 1, as it is known in practice and commercially available in the Netherlands, for example, from the firm of "Cycklop International".

Figure 2:
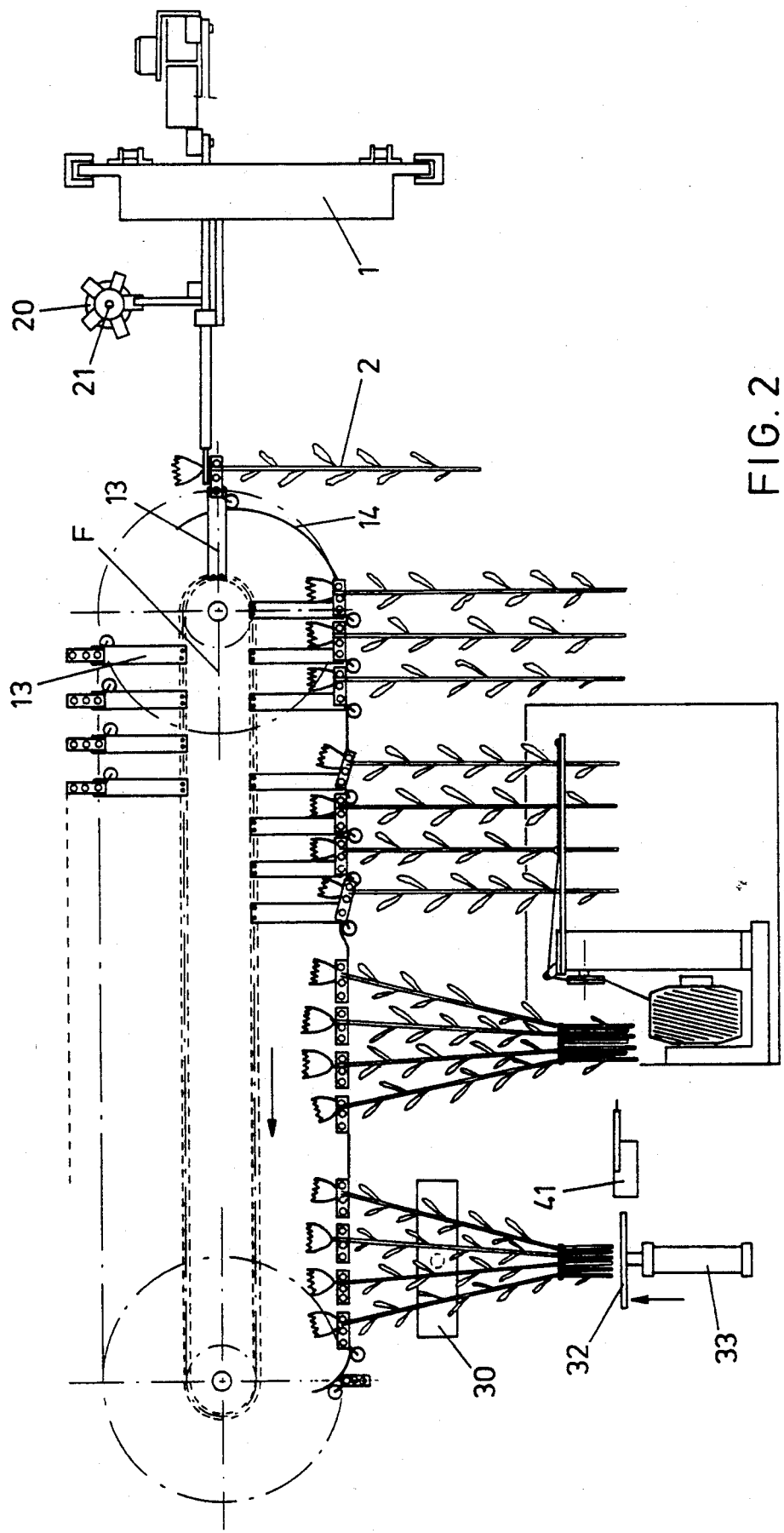
FIG. 2 illustrates a cross-sectional view taken on the line II-II of FIG. 1.
Figure 3:
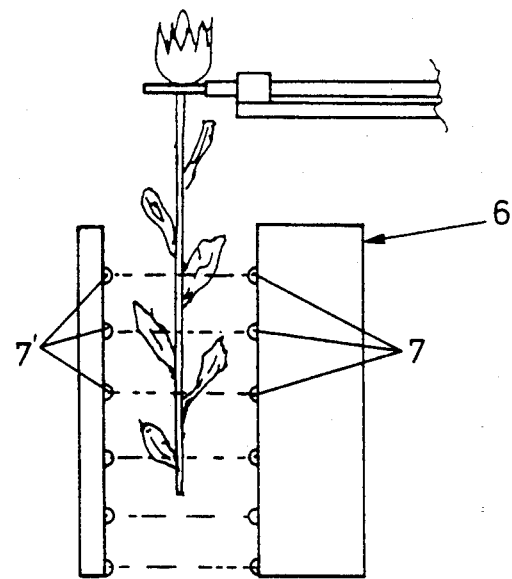
FIG. 3 shows a diagrammatic side-elevational view of the stem length measuring device.

The direction of movement of conveyors 10 is perpendicular to that of conveyor 1, with conveyors 10 circulating in the vertical plane and conveyor 1 in the horizontal plane located approximately at the level of the median plane F of conveyor 10 (see FIG. 2). In the transfer point or place between conveyors 1 and 10, one second flower supporting member 11 of conveyor 10, secured to a mounting yoke 13 (see FIG. 2), is in the median plane F of said conveyor, which creates sufficient space for such transfer. This transfer is facilitated when the tines of the forks of the first conveyor or the ends 42, 43 (see FIG. 1) of the forks of member 11 are given a V-shaped configuration, with the leading tine being optionally shorter than the other tine.

Figure 5:
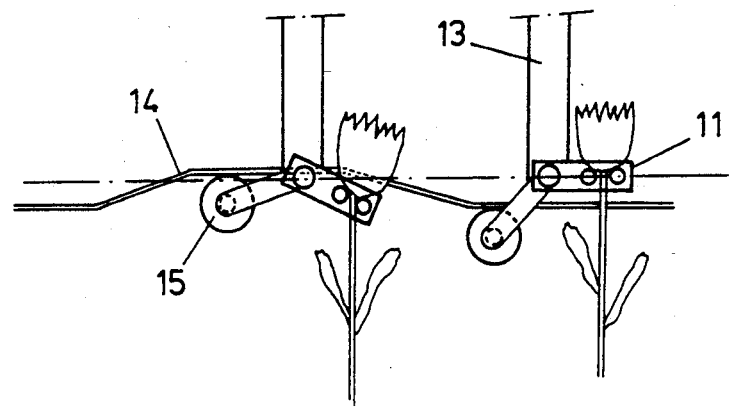
FIG. 5 shows the means for changing the height of the flower supporting members to provide for a substantially flat top after the removal of a bundled bunch of flowers.

When the flowers have been bundled, they are cut to a uniform size by means of a sawing device or cutter 41, shown diagrammatically in FIG. 1. Before the cutting operation, as shown in FIG. 5, some forks of members 11 are lowered a little relatively to the adjacent forks of members 11 of a group by means of a guide track 14, along which rollers 15 run, which are connected to members 11 (see FIG. 5). It is thus achieved that the flowers of each bunch are in virtually co-planar relationship after bundling, i.e. after removing from the conveyor.

After the bundling and cutting operations, the flowers are moved out of the conveyor bunch by bunch by means of a shift plate 30 (see FIG. 2) operated by a pneumatic cylinder 33. As they are shifted out, the bunch of flowers is raised somewhat by means of a lift table 32 operable by the pneumatic cylinder 33, to prevent the flowers from sliding or chafing over the upper surfaces of the bifurcated flower supporting members 11.

What I claim is:

1. In a method of sorting and bundling flowers, wherein separated flowers are hung in a plurality of first supporting members circulating on a first conveyor, the flowers are selected as to at least on common characteristic thereof and then transferred to a bundling conveyor where the flowers are bundled according to the common characteristic, the improvement comprising circulating the first conveyor in a first closed path to a transfer place, circulating the bundling conveyor having a plurality of second supporting members in a second closed path which is perpendicular to the first closed path until a selected second supporting member is oriented in the path of movement at said transfer place of a selected first supporting member carrying a selected flower and allowing the selected flowers in the selected first supporting member to be directly transferred at said transfer place to the selected second supporting member and without passing through any intermediate conveyors.

2. A method of sorting and bundling flowers having a common characteristic, comprising:
   (1) hanging a plurality of separated flowers in a plurality of first flower supporting members which are movably held in a corresponding plurality of carriers circulating in a first closed path;
   (2) determining at least one characteristic of the flower in each first supporting member and designating each of the first supporting member or carrier according to the characteristic of the flower held thereby;
   (3) moving the carriers along said first path in a selected direction of movement to a transfer place;
   (4) moving a plurality of second supporting members in a second closed path which is perpendicular to the first closed path until a selected second supporting member is stationary at said transfer place, said second supporting members having an elongated opening oriented toward the direction of movement of a first supporting member at said transfer place, and said elongated opening being sufficient to receive a plurality of flowers;
   (5) determining the designation of the first supporting members or carriers and selecting from those designations a selected first supporting member from which its selected flower is to be transferred to a selected second supporting member;
   (6) moving the selected first supporting member from a transport position in its carrier to a transfer position in its carrier such that the selected flower in that selected first supporting member is received into the elongated opening of the selected second supporting member and transferred thereto;
   (7) continuing steps (1) through (6) until a predetermined number of selected flowers having a common characteristic are in the opening of the said selected second supporting member; and
   (8) bundling the flowers in the selected second supporting member into a bundle of flowers having a common characteristic.

3. An apparatus for sorting and bundling flowers having a common characteristic, comprising:
   (1) a plurality of first flower supporting members movably held in a corresponding plurality of carriers which are circulatable in a first closed path in a selected direction of movement, said first supporting member being configured to releasably receive and hold a flower therein;
   (2) determining means for determining at least one characteristic of the flower in each first supporting member and designation means for designating each of the first supporting member or the carrier according to the characteristic of a flower held thereby;
   (3) first moving means for moving the carriers along said first path to a transfer place;
   (4) second moving means for moving a plurality of second supporting members in a second closed path which is perpendicular to the first closed path until a selected second supporting member is stationary at said transfer place, said second supporting members having an elongated opening oriented toward the direction of movement of a first supporting member at said transfer place and said elongated opening being sufficient to receive a plurality of flowers;
   (5) designation determining means for determining the designations on the first supporting members or carriers and selecting means for selecting from those designations a selected first supporting member from which its selected flower is to be transferred to a selected second supporting member;

(6) third moving means for moving the selected supporting member from a transport position in its carrier to a transfer position in its carrier such that the selected flower in that selected first supporting member is received into the elongate opening of the selected second supporting member and transferred thereto;

(7) second determining means for determining when a predetermined number of selected flowers having a common characteristic are in the opening of said selected second supporting member; and (8) means for bundling the flowers in the selected second supporting member into a bundle of flowers having a common characteristic.

4. Apparatus as claimed in claim 3, wherein each first supporting member is mounted for axial sliding movement in its carrier and each carrier has a spring-loaded catch mechanism for holding the first supporting member in an extended transfer position, said catch mechanism being arranged to be unlocked by means of a cam of a camset arranged in its path of movement.

5. Apparatus as claimed in claim 4, wherein the camset is arranged adjacent the transfer place, said camset having as many cams as the number of flowers which are to be received in the second supporting member, which cams can alternately be moved into the path of movement of the catch mechanism.

6. Apparatus as claimed in claim 3, wherein the elongate opening of the second supporting members is a slot adapted to receive a predetermined number of flowers.

7. Apparatus according to claim 3, wherein the first supporting members are connected to a first circulating conveyor, the second supporting members are connected to a second conveyor by means of mounting yokes, said second conveyor being moveable in a vertical plane, and its median plane being approximately at the level of a horizontal plane of movement of the first conveyor, the conveyors being arranged such that at the transfer place, each second supporting member extends with its elongated opening horizontal and is located in the plane of movement of the first conveyor, in spaced relationship to the mounting yokes.

8. Apparatus as claimed in claim 7, wherein the second supporting members are pivoted to the associated mounting yokes and by means of a guide track and spring-mounted traveling rollers cooperating with said guide track are caused to occupy a horizontal position during the transfer of flowers and the bundling thereof.

9. Apparatus as claimed in claim 8, characterized in that said guide track includes vertically elevated portions in order that the front and rear flower supporting members of a group may be varied in height relative to each other.

10. Apparatus as claimed in claim 3, wherein spaces are provided between groups of second supporting members to enhance the assessibility of a group thereof for bundling the flowers into bunches.

11. Apparatus as claimed in claim 3, further comprising means for cutting the stems of and for lifting a cut bunch of flowers a small distance just before they are moved out of the second supporting members to prevent injury to the flowers as they are so moved out.

12. Apparatus as claimed in claim 3, further comprising means for wetting the first supporting members.

13. Apparatus as claimed in claim 12, wherein said wetting means is constituted by one or more sprayers, brushes, or sponges.

14. Apparatus as claimed in claim 3, wherein tine ends of an elongated opening of the first supporting members are arranged in a fork-like configuration with the leading tine of each fork being shorter than the trailing tine.

* * * * *